US012312151B2

(12) United States Patent
Diamond et al.

(10) Patent No.: US 12,312,151 B2
(45) Date of Patent: May 27, 2025

(54) INSULATED CONTAINER

(71) Applicant: Igloo Products Corp., Katy, TX (US)

(72) Inventors: Jeff Diamond, Torrance, CA (US); Doug Hardesty, Katy, TX (US); John Maldonado, Katy, TX (US)

(73) Assignee: Igloo Products Corp., Katy, TX (US)

(*) Notice: Subject to any disclaimer, the term of this patent is extended or adjusted under 35 U.S.C. 154(b) by 0 days.

(21) Appl. No.: 18/332,925

(22) Filed: Jun. 12, 2023

(65) Prior Publication Data

US 2023/0406601 A1 Dec. 21, 2023

Related U.S. Application Data

(60) Provisional application No. 63/353,281, filed on Jun. 17, 2022.

(51) Int. Cl.

| | |
|---|---|
| ***A45C 11/20*** | (2006.01) |
| ***B65D 25/02*** | (2006.01) |
| ***B65D 25/20*** | (2006.01) |
| ***B65D 43/14*** | (2006.01) |
| ***B65D 81/38*** | (2006.01) |
| ***H04R 1/02*** | (2006.01) |

(52) U.S. Cl.
CPC ......... *B65D 81/3823* (2013.01); *B65D 25/02* (2013.01); *B65D 25/20* (2013.01); *B65D 43/14* (2013.01); *H04R 1/025* (2013.01)

(58) Field of Classification Search
CPC .... B65D 25/20; B65D 43/14; B65D 81/3823; A45C 11/20; H04R 1/02; H04R 1/025
USPC ...... 206/541; 62/371, 457.1, 457.7; 455/344
See application file for complete search history.

(56) References Cited

U.S. PATENT DOCUMENTS

| | | | | |
|---|---|---|---|---|
| 4,213,310 A | | 7/1980 | Buss | |
| D257,934 S | | 1/1981 | Buss | |
| 4,295,345 A | * | 10/1981 | Atkinson ........... | B65D 81/3886 206/427 |
| D267,444 S | | 1/1983 | Ruxton | |
| D268,979 S | | 1/1983 | Ruxton | |
| D269,398 S | | 6/1983 | Ruxton | |
| D289,597 S | | 5/1987 | Averitt | |
| D292,056 S | | 9/1987 | Decker | |
| 4,696,412 A | | 9/1987 | McGowan | |
| 4,700,395 A | * | 10/1987 | Long ...................... | A45C 11/20 62/529 |
| 4,817,191 A | * | 3/1989 | Adams ................... | A45C 15/00 455/344 |

(Continued)

FOREIGN PATENT DOCUMENTS

| | | |
|---|---|---|
| AU | 2707277 | 1/1979 |
| AU | 83403 | 9/1981 |

(Continued)

OTHER PUBLICATIONS

US 11,692,755 B2, 07/2023, Wang et al. (withdrawn)

(Continued)

*Primary Examiner* — Luan K Bui
(74) *Attorney, Agent, or Firm* — Dinsmore & Shohl LLP

(57) ABSTRACT

Present embodiments relate to an insulated container. More particularly, but without limitation, the present embodiments relate to an insulated container with built-in wireless audio for communication and audio playback from a smart device for audio playback.

21 Claims, 9 Drawing Sheets

(56) References Cited

U.S. PATENT DOCUMENTS

| | | | | |
|---|---|---|---|---|
| D307,998 | S | 5/1990 | Costello | |
| 4,939,912 | A * | 7/1990 | Leonovich, Jr. ....... | A45C 15/00 381/334 |
| D323,950 | S | 2/1992 | Pleet | |
| 5,235,822 | A * | 8/1993 | Leonovich, Jr. ....... | A45C 11/20 455/344 |
| 5,319,937 | A | 6/1994 | Fritsch | |
| D349,007 | S | 7/1994 | Costello | |
| D352,420 | S | 11/1994 | Costello | |
| 5,810,168 | A * | 9/1998 | Eggering ............... | A45C 15/00 455/344 |
| D400,053 | S | 10/1998 | Coffee | |
| 5,860,281 | A | 1/1999 | Coffee | |
| D486,357 | S | 2/2004 | Leba | |
| D497,517 | S | 10/2004 | Reuter | |
| D500,057 | S | 12/2004 | Reuter | |
| 7,051,550 | B2 | 5/2006 | Roth | |
| D527,226 | S | 8/2006 | Maldonado | |
| D528,368 | S | 9/2006 | Maldonado | |
| D529,344 | S | 10/2006 | Maldonado | |
| 7,140,507 | B2 | 11/2006 | Maldonado | |
| D534,771 | S | 1/2007 | Zorn | |
| 7,344,028 | B2 | 3/2008 | Hanson | |
| 7,806,271 | B1 * | 10/2010 | Kraska ................... | A45C 15/00 206/541 |
| 8,567,211 | B2 * | 10/2013 | Al-Rasheed .............. | F25D 3/08 62/331 |
| 9,366,467 | B2 | 6/2016 | Kiedaisch | |
| D792,486 | S | 7/2017 | Li | |
| D802,028 | S | 11/2017 | Li | |
| D802,029 | S | 11/2017 | Li | |
| D802,630 | S | 11/2017 | Li | |
| D820,049 | S | 6/2018 | Ahlstrom | |
| D836,993 | S | 1/2019 | Meda | |
| D836,994 | S | 1/2019 | Meda | |
| D844,386 | S | 4/2019 | Ahlstrom | |
| D887,788 | S | 6/2020 | Meda | |
| D888,503 | S | 6/2020 | Meda | |
| D894,043 | S | 8/2020 | Meda | |
| D901,986 | S | 11/2020 | Meda | |
| D904,830 | S | 12/2020 | Meda | |
| D907,074 | S | 1/2021 | Yang | |
| D920,743 | S | 6/2021 | Meda | |
| D921,439 | S | 6/2021 | Meda | |
| 11,027,885 | B2 | 6/2021 | Duong | |
| D927,938 | S | 8/2021 | Meda | |
| D929,471 | S | 8/2021 | Meda | |
| D933,449 | S | 10/2021 | Ahlström | |
| D935,280 | S | 11/2021 | Thelin | |
| D953,814 | S | 6/2022 | Thelin | |
| D954,764 | S | 6/2022 | Meda | |
| 11,359,848 | B2 | 6/2022 | Guan | |
| 11,414,238 | B2 | 8/2022 | Ahlström | |
| 11,415,355 | B2 | 8/2022 | Thelin et al. | |
| 11,535,425 | B2 | 12/2022 | Ahlström et al. | |
| 11,623,793 | B2 | 4/2023 | Duong et al. | |
| D985,359 | S | 5/2023 | Ahlström et al. | |
| D995,264 | S | 8/2023 | Ahlström et al. | |
| 11,754,332 | B2 | 9/2023 | Guan et al. | |
| 2004/0089582 | A1 | 5/2004 | Hendrix, Jr. | |
| 2004/0178208 | A1 | 9/2004 | Minh | |
| 2005/0127081 | A1 | 6/2005 | Minh | |
| 2005/0263432 | A1 | 12/2005 | Hanson | |
| 2005/0263527 | A1 | 12/2005 | Maldonado | |
| 2005/0263528 | A1 | 12/2005 | Maldonado | |
| 2005/0279123 | A1 | 12/2005 | Maldonado | |
| 2005/0279124 | A1 | 12/2005 | Maldonado | |
| 2007/0023439 | A1 | 2/2007 | Vaughn | |
| 2008/0001373 | A1 | 1/2008 | Vaughn | |
| 2008/0006629 | A1 | 1/2008 | Roth | |
| 2008/0025544 | A1 | 1/2008 | Maldonado | |
| 2011/0182532 | A1 | 7/2011 | Baltus | |
| 2011/0197625 | A1 | 8/2011 | Urban | |
| 2013/0340467 | A1 | 12/2013 | Kiedaisch | |
| 2016/0153690 | A1 | 6/2016 | Patsis et al. | |
| 2016/0187046 | A1 * | 6/2016 | Chen ...................... | A45C 15/00 62/331 |
| 2017/0023290 | A1 | 1/2017 | DeMuth | |
| 2018/0141718 | A1 | 5/2018 | Ahlstrom | |
| 2019/0161240 | A1 | 5/2019 | Ahlstrom | |
| 2020/0062454 | A1 | 2/2020 | Duong | |
| 2020/0140165 | A1 | 5/2020 | Maldonado | |
| 2020/0216229 | A1 | 7/2020 | Weixian | |
| 2020/0217571 | A1 | 7/2020 | Weixian | |
| 2020/0217574 | A1 | 7/2020 | Thelin | |
| 2020/0217575 | A1 | 7/2020 | Thelin | |
| 2020/0217576 | A1 | 7/2020 | Weixian | |
| 2020/0217578 | A1 | 7/2020 | Wang | |
| 2021/0070523 | A1 | 3/2021 | Iyer | |
| 2021/0070528 | A1 | 3/2021 | Iyer | |
| 2021/0071930 | A1 | 3/2021 | Iyer | |
| 2021/0123656 | A1 | 4/2021 | Barros | |
| 2021/0127808 | A1 | 5/2021 | Thelin | |
| 2021/0214123 | A1 | 7/2021 | Iyer | |
| 2021/0229893 | A1 | 7/2021 | Maldonado | |
| 2021/0253305 | A1 | 8/2021 | Duong | |
| 2021/0285710 | A1 | 9/2021 | Barros | |
| 2022/0114847 | A1 | 4/2022 | Emde | |
| 2022/0114853 | A1 | 4/2022 | Emde | |
| 2022/0119152 | A1 | 4/2022 | Blankinship | |
| 2022/0182765 | A1 * | 6/2022 | Tabata ................... | H04R 9/025 |
| 2022/0228406 | A1 | 7/2022 | Barros | |
| 2022/0290907 | A1 | 9/2022 | Guan et al. | |
| 2022/0338603 | A1 | 10/2022 | Gamboa et al. | |
| 2022/0355984 | A1 | 11/2022 | Guan et al. | |
| 2022/0388722 | A1 | 12/2022 | Ahlström et al. | |
| 2022/0390163 | A1 | 12/2022 | Thelin et al. | |
| 2023/0030046 | A1 | 2/2023 | Lundqvist et al. | |
| 2023/0032389 | A1 | 2/2023 | Barros et al. | |
| 2023/0034471 | A1 | 2/2023 | Rode et al. | |
| 2023/0131752 | A1 | 4/2023 | Ahlström et al. | |
| 2023/0166901 | A1 | 6/2023 | Harrison et al. | |

FOREIGN PATENT DOCUMENTS

| | | |
|---|---|---|
| AU | 83402 | 4/1982 |
| AU | 93721 | 10/1986 |
| AU | 2005262599 | 1/2006 |
| AU | 2011215734 | 8/2012 |
| AU | 201712770 | 5/2017 |
| AU | 201712777 | 5/2017 |
| AU | 201712780 | 5/2017 |
| AU | 201712782 | 5/2017 |
| AU | 201712791 | 5/2017 |
| AU | 201712799 | 5/2017 |
| AU | 201712802 | 5/2017 |
| AU | 201712803 | 5/2017 |
| AU | 201712785 | 7/2017 |
| AU | 201716789 | 11/2017 |
| AU | 201716791 | 11/2017 |
| AU | 201717667 | 1/2018 |
| AU | 201717669 | 1/2018 |
| AU | 201717670 | 1/2018 |
| AU | 201717674 | 1/2018 |
| AU | 201717676 | 1/2018 |
| AU | 201717662 | 2/2018 |
| AU | 201816061 | 1/2019 |
| AU | 201910011 | 2/2019 |
| AU | 201913598 | 8/2019 |
| AU | 201913601 | 8/2019 |
| AU | 201913603 | 8/2019 |
| AU | 201913604 | 8/2019 |
| AU | 201913607 | 8/2019 |
| AU | 201913624 | 8/2019 |
| AU | 201913626 | 8/2019 |
| AU | 201913627 | 8/2019 |
| AU | 201913631 | 8/2019 |
| AU | 201913633 | 8/2019 |
| AU | 202012545 | 6/2020 |
| AU | 202012548 | 6/2020 |
| AU | 2019284128 | 7/2020 |
| AU | 2019284129 | 7/2020 |
| AU | 2019284130 | 7/2020 |

(56) References Cited

FOREIGN PATENT DOCUMENTS

| | | | |
|---|---|---|---|
| AU | 2019284131 | | 7/2020 |
| AU | 2019284133 | | 7/2020 |
| AU | 2019284134 | | 7/2020 |
| AU | 2019302329 | | 1/2021 |
| AU | 2019325454 | | 1/2021 |
| AU | 2019376154 | | 3/2021 |
| AU | 2019371335 | | 5/2021 |
| AU | 2022202482 | A1 | 11/2022 |
| AU | 2021278986 | A1 | 12/2022 |
| CA | 48429 | | 7/1981 |
| CA | 48762 | | 10/1981 |
| CA | 53100 | | 7/1984 |
| CA | 1281859 | | 3/1991 |
| CA | 2229259 | | 8/1998 |
| CA | 2460597 | | 9/2004 |
| CA | 2570413 | | 1/2006 |
| CA | 2789507 | | 8/2011 |
| CA | 179459 | | 12/2018 |
| CA | 179460 | | 12/2018 |
| CA | 3105713 | | 1/2020 |
| CA | 3106550 | | 2/2020 |
| CA | 3117297 | | 5/2020 |
| CA | 214387 | | 7/2022 |
| CN | 101370699 | | 2/2009 |
| CN | 101431913 | | 5/2009 |
| CN | 206488529 | | 9/2017 |
| CN | 207081259 | | 3/2018 |
| CN | 305240920 | | 10/2018 |
| CN | 106233083 | | 7/2019 |
| CN | 110191654 | | 8/2019 |
| CN | 209893773 | | 1/2020 |
| CN | 305553099 | | 1/2020 |
| CN | 305751278 | | 5/2020 |
| CN | 306079204 | | 9/2020 |
| CN | 112424547 | | 2/2021 |
| CN | 112585416 | | 3/2021 |
| CN | 112955703 | | 6/2021 |
| CN | 112996411 | | 6/2021 |
| CN | 115214988 | A | 10/2022 |
| CN | 307619228 | | 10/2022 |
| CN | 115298096 | A | 11/2022 |
| CN | 115667818 | A | 1/2023 |
| DE | 20110247 | | 12/2002 |
| DE | 202004010081 | | 9/2004 |
| DE | 202007001638 | | 5/2007 |
| DE | 202009015164 | | 3/2010 |
| DE | 202014000386 | | 4/2014 |
| DE | 202013007655 | | 1/2015 |
| DE | 102011100722 | | 11/2017 |
| DE | 102019200065 | | 1/2019 |
| DE | 102019200067 | | 1/2019 |
| DE | 102019200068 | | 1/2019 |
| DE | 102019200070 | | 1/2019 |
| DE | 112017005901 | | 8/2019 |
| DE | 102019200063 | | 7/2020 |
| DE | 102019200064 | | 7/2020 |
| DE | 212020000770 | U1 | 9/2022 |
| EP | 1765109 | | 3/2007 |
| EP | 2534026 | | 12/2012 |
| EP | 2772704 | | 2/2013 |
| EP | 3821186 | | 5/2021 |
| EP | 3841338 | | 6/2021 |
| EP | 3874211 | | 9/2021 |
| EP | 3876785 | | 9/2021 |
| EP | 4045856 | A1 | 8/2022 |
| EP | 4072950 | A1 | 10/2022 |
| EP | 4079184 | A1 | 10/2022 |
| EP | 4133221 | A1 | 2/2023 |
| ES | 1030365 | | 8/1995 |
| ES | 1030365 | U | 7/1996 |
| JP | 11006677 | Y | 1/1999 |
| KR | 1020040080384 | | 9/2004 |
| KR | 1020210040356 | | 4/2021 |
| KR | 1020210048496 | | 5/2021 |
| KR | 1020210084483 | | 7/2021 |
| MX | PA04001493 | | 12/2004 |
| MX | PA06014878 | | 10/2007 |
| WO | 2005123539 | | 12/2005 |
| WO | 2006007266 | | 1/2006 |
| WO | 2006009537 | | 1/2006 |
| WO | 2007016092 | | 2/2007 |
| WO | 2008013973 | | 1/2008 |
| WO | 2011094355 | | 8/2011 |
| WO | 2011100522 | | 8/2011 |
| WO | 2014131679 | | 9/2014 |
| WO | 2018095957 | | 5/2018 |
| WO | 2018233611 | | 12/2018 |
| WO | 2020013913 | | 1/2020 |
| WO | 2020041236 | | 2/2020 |
| WO | 2020091849 | | 5/2020 |
| WO | 2021050253 | | 3/2021 |
| WO | 2021050255 | | 3/2021 |
| WO | 2021050298 | | 3/2021 |
| WO | 2021086620 | | 5/2021 |
| WO | 2021145971 | | 7/2021 |
| WO | 2021154394 | | 8/2021 |
| WO | 2022081513 | | 4/2022 |
| WO | 2022232513 | A1 | 11/2022 |
| WO | 2023275799 | A1 | 1/2023 |
| WO | 2023009603 | A1 | 2/2023 |
| WO | 2023101721 | A1 | 6/2023 |

OTHER PUBLICATIONS

U.S. Appl. No. 63/353,281 titled Insulated Container filed Jun. 17, 2022.

EP Application No. 23179025.4 titled Insulated Container filed on Jun. 13, 2023.

CN Application No. 202310721629.4 titled Insulated Container filed on Jun. 16, 2023.

AU Application No. 2023203756 titled Insulated Container filed on Jun. 16, 2023.

Dometic Product Catalog—Coolers; 2015.

Dometic Product Catalog—Coolers; 2016.

Design U.S. Appl. No. 29/820,716, filed Dec. 23, 2021 titled Container.

Design U.S. Appl. No. 29/820,717, filed Dec. 23, 2021 titled Container.

Design U.S. Appl. No. 29/840,161, filed May 26, 2022 titled Cooler Fender Frame.

Design U.S. Appl. No. 29/836,642, filed Apr. 28, 2022 titled Half Sleeve Ice Block.

Design U.S. Appl. No. 29/823,704, filed Jan. 19, 2022 titled Insulated Box.

MX Application No. MX/f/2022/002028 filed Jul. 19, 2022 titled Insulated Box.

EU App. No. 009092620 filed Jul. 19, 2022 titled Insulated Box.

U.S. Appl. No. 63/482,354, filed Jan. 31, 2023 titled Modular Container.

U.S. Appl. No. 18/464,742, filed Sep. 11, 2023 titled Mobile Cooling Box with Ice Maker.

Thailand Patent Application No. 1702001859 filed May 22, 2017 titled Cooler.

Design U.S. Appl. No. 29/882,068, filed Jan. 10, 2023 titled Container.

Design U.S. Appl. No. 29/869,843, filed Jan. 10, 2023 titled Container.

Design U.S. Appl. No. 29/869,844, filed Jan. 10, 2023 titled Container.

U.S. Appl. No. 63/482,477, filed Jan. 31, 2023 titled Pivot Handle for a Cooler.

Design U.S. Appl. No. 29/870,842, filed Feb. 6, 2023 titled Latch for a Cooler.

Design U.S. Appl. No. 29/870,843, filed Feb. 6, 2023 titled Cooler and Latch.

U.S. Appl. No. 18/186,346, filed Mar. 20, 2023 titled Container with One or More Tray Retention Portions and Support Stand.

U.S. Appl. No. 18/332,925, filed Jun. 12, 2023 titled Insulated Container.

(56) References Cited

OTHER PUBLICATIONS

U.S. Appl. No. 63/584,607, filed Sep. 22, 2023 titled Insulated Container.
Design U.S. Appl. No. 29/872,119, filed Mar. 7, 2023 titled Insulated Container.
Design U.S. Appl. No. 29/914,130, filed Oct. 13, 2023 titled Insulated Container.
U.S. Appl. No. 18/502,801, filed Nov. 6, 2023 titled Mobile Cooling Box with Hinge Module.
U.S. Appl. No. 18/556,450, filed Oct. 20, 2023 titled Accessory Grid for a Container.
U.S. Appl. No. 18/264,689, filed Aug. 8, 2023 titled Temperature Control Module and Delivery Box Cabinet.
Design U.S. Appl. No. 29/875,737, filed May 9, 2023 titled Insulated Container.
Igloo Coolers : Rewind, Hit, Play. KoolTunes (TM) Playmate Classic Is Back! Retrieved From: URL: https://www.igloocoolers.com/blogs/news/rewind-hit-play-kooltunes-is-back, May 12, 2022.
Magda Hernandez : "Igloo Brings Back Its KoolTunes Playmate Cooler with Built-in Speakers", Retrieved URL : https://shop-eat-surf.com/2022/05/igloo-brings-back-its-kooltunes-playmate-cooler-with-built-in-speakers/, May 12, 2022.
Tim Huber: "Igloo KoolTunes Cooler HiConsumption", Retrieved from https://hiconsumption.com/tech/igloo-kooltunes-cooler/, May 25, 2022.
Extended European Search Report Issued in EP Patent Application 23179025.4 Mailed on Feb. 2, 2024.

* cited by examiner

INSULATED CONTAINER

CLAIM TO PRIORITY

This non-provisional patent application claims priority to and benefit of, under 35 U.S.C. § 119(e), U.S. Provisional Patent Application Ser. No. 63/353,281, filed Jun. 17, 2022 and titled "Insulated Container", all of which is incorporated by reference herein.

BACKGROUND

1. Field of the Invention

Present embodiments relate to an insulated container. More particularly, but without limitation, the present embodiments relate to an insulated container with integrated wireless audio for communication with a smart device for audio playback.

SUMMARY

The present application discloses one or more of the features recited in the appended claims and/or the following features which alone or in any combination, may comprise patentable subject matter.

Present embodiments relate to an insulated container, such as a cooler, with built-in or integrated speakers and wireless communication for playback from a smart device, such as a phone, table, laptop or other source. The cooler has an integrally molded speaker cavity and a cavity for an electronics assembly that is positioned in the cooler. The electronics assembly provides a rechargeable power supply to power the electronics assembly for playback over at least one speaker.

According to some embodiments, an insulated container may comprise a base and a lid disposed on top of the base, the base having an outer shell and an inner shell, and an insulator disposed between the outer shell and the inner shell, each the outer shell and the inner shell having a floor and at least one wall extending from the floor, a cavity defined within the inner shell for storage within the base. The lid may have a first upper surface, a second upper surface, and opposed first and second end walls, each of the first and second end walls pivotally connected to the base, so that the lid is pivotable from a first closed position to a second open position, at least one opening molded in the at least one wall or the floor of the outer shell and at least one speaker cavity molded in the outer shell of the base, a panel having an electronics assembly mounted thereon, the panel including a circuit board, at least one rechargeable battery, at least one communication module in communication with the circuit board, the panel located at the opening, a wired connection extending between at least one speaker assembly and the panel between the inner shell, the outer shell, and through the insulator.

The following features may be used in combination with the insulated container alone or in combination with one or more other features.

In some aspects, the insulated container may further comprise a handle on one of the base or the lid.

In some aspects, the panel may comprise a flange.

In some aspects, the panel may further comprise a plurality of fastening apertures on the flange.

In some aspects, the panel may comprise a plurality of controls.

In some aspects the insulated container may further comprise a fastener cover disposed around the panel and over the flange.

In some aspects, the panel may be a removable panel.

In some aspects the at least one speaker assembly may be located on an opposite side of the base from the panel.

In some aspects the insulated container may further comprise a second speaker cavity for positioning of a second speaker assembly.

In some aspects, the at least one speaker assembly may comprise a mounting plate, a speaker cone, and a resonator.

In some aspects, the insulated container may further comprise a communications module having a wireless communication circuit, for wireless communication with a smart device.

In some aspects, the insulated container may further comprise a first pivot and a second pivot connecting the base and the lid.

In some aspects, the outer shell may be a high density polyethylene.

In some aspects, the inner shell being a polypropylene.

In some aspects, the insulator may be a polyurethane.

In some aspects, the at least one communication module comprises a Bluetooth standard, or a Wi-Fi standard, or another wireless communication standard.

In some aspects, the lid may be pivotally connected to the base at ends of the lid and the base.

According to some embodiments, an insulated container may comprise a base having an inner shell and an outer shell defining an insulated cavity for storage, a lid pivotally connected to the base and covering the insulated cavity, a panel having an electronics assembly comprising a rechargeable battery, at least one communications module, and a plurality of controls, an opening formed in one of a plurality of walls, the opening covered by the panel, at least one speaker disposed in another of the plurality of walls, each of the at least one speaker and the panel being fastened to a corresponding portion of the outer shell, the fasteners covered by fastener covers surrounding the panel and surrounding the at least one speaker, a wire extending within a floor or at least one of the plurality of walls, between the electronic assembly and the at least one speaker.

The following features may be used in combination with the insulated container alone or in combination with one or more other features.

In some aspects, the insulated container may further comprise a resonator mounted on a mounting plate with the at least one speaker.

In some aspects, the insulated container may further comprise a grill disposed over the at least one speaker and resonator.

In some aspects, the grill may occlude visibility of the at least one speaker and the resonator.

In some aspects, the electronic assembly having wireless connectivity for communication with a smart device.

In some aspects the lid may be movable relative to the base.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of an insulated container will now be described by way of examples. These embodiments are not to limit the scope of the claims as other embodiments of an insulated container will become apparent to one having ordinary skill in the art upon reading the instant description. Non-limiting examples of the present embodiments are shown in figures wherein:

DETAILED DESCRIPTION

Figure 1:
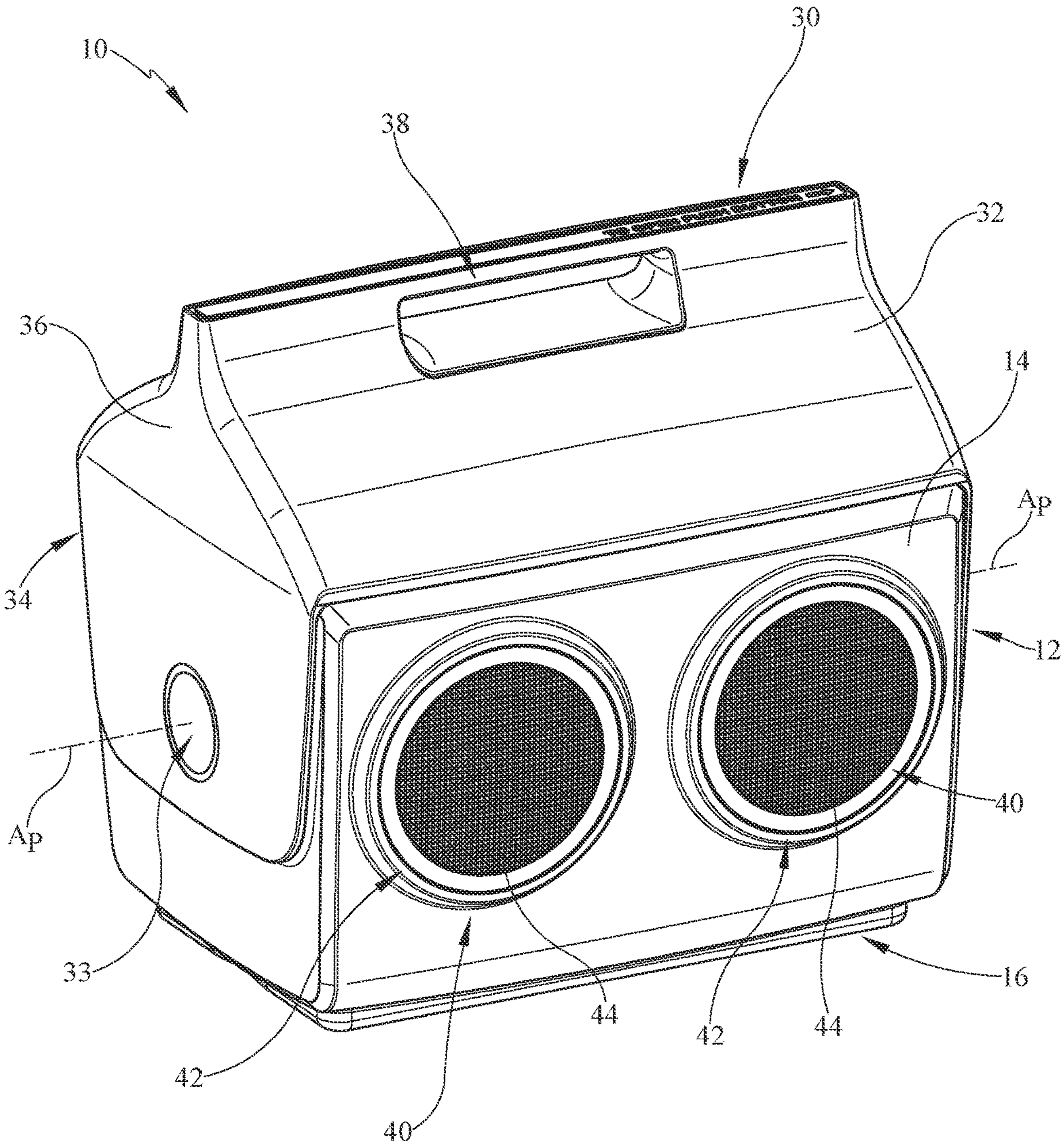
FIG. 1 is a perspective view of an example insulated container including a lid in a closed position.

It is to be understood that an insulated container is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of “including,” “comprising,” or “having” and variations thereof herein is meant to encompass the items listed thereafter and equivalents thereof as well as additional items. Unless limited otherwise, the terms “connected,” “coupled,” and “mounted,” and variations thereof herein are used broadly and encompass direct and indirect connections, couplings, and mountings. In addition, the terms “connected” and “coupled” and variations thereof are not restricted to physical or mechanical connections or couplings.

Reference throughout this specification to “one embodiment”, “some embodiments” or “an embodiment” means that a particular feature, structure or characteristic described in connection with the embodiment is included in at least one embodiment of the present invention. Thus, appearances of the phrases “in one embodiment”, “in some embodiments” or “in an embodiment” in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Referring now to FIGS. 1-9, an insulated container, for example a cooler, which may be used for cooling, or for heated, drinks or food products in order to reduce heat exchange and maintain a desired temperature, and which additionally has features which allow for audio playback. For example, the insulated container may include at least one speaker assembly and a power source to power the speaker playback, as well as wired and wireless connectivity to an audio source, for example a smart device such as a smart phone, pad/tablet, watch, etc.

Referring now to FIG. 1, a perspective view of a non-limiting example insulated container 10 is depicted. In these examples, the term “cooler” is used interchangeably. While the term cooler is used, one skilled in the art will recognize that the cooler is an insulated container that may be used to reduce or slow heat transfer and therefore may be used for both cool goods and for hot goods, for example food or drinks. The insulated container 10 may include a passive cooler which utilizes ice to maintain cool temperatures, or may be an active cooler which includes a compression or absorption based cooling system thermoelectric, or other heat exchange system, to maintain temperature within the cooler 10.

The cooler 10 has a base 12 defined by one or more walls 14 and a floor 16 from which the one or more walls 14 extend. The one or more walls 14 and the floor 16 of the base 12 define a cavity 18 (FIG. 2) in which contents may be stored. In the instant embodiment, the one or more walls 14 define a rectangular shaped cavity in which food may be stored. The one or more walls 14 may define various cavity 18 (FIG. 2) shapes and may be formed in various configurations. For non-limiting example, the one or more walls 14 may be vertical or may be tapered as shown. In the instant embodiment there are two long walls and two short walls. However, other arrangements may be used and these examples are not limited.

The cooler 10 further comprises a lid 30 which is disposed on top of the base 12. The lid 30, in some embodiments, may be pivotally connected to the base 12, but also may be removable or non-removable and is generally movable relative to the base 12 in order to access the interior of the base 12. The pivot axis $A_p$ may be at or near an upper end of the one or more walls, or as depicted, the axis of pivot $A_p$ of the lid 30 may be lower. In this embodiment the pivot axis $A_p$ of the lid 30 is lower on the at least one wall 14 and extends through the two opposed shorter, end walls 14 so that the lid pivots out of the way to access the interior cavity 18 of the base 12. The pivot axis $A_p$ is also centrally located relative to the lid 30. In other embodiments, the lid 30 may also be of the type which pivots at an upper end of the one or more walls 14 and non-centrally located—for example along a peripheral edge. For example, such lid might be a flat lid, instead of a tented design depicted. Additionally, such lid may also be pivoted along a long wall or a short wall of the base 12.

The lid 30 is shown in the example with a first panel 32 and a second panel 34 which rise to an upper position 36 where they join. The first and second panels 32, 34 provide a tented shaped in the instant embodiment wherein a handle 38 allows for pivoting the lid 30 about the axis $A_p$. The handle 38 is formed at the upper location 36 of the lid 30 where the first and second panels 32, 34 join. In other embodiments, the lid 30 may include hinges 33 that allow rotating of the lid along an edge of the base 12.

The base 12 and the lid 30 may or may not be insulated so that the contents being stored therein either stay cold, stay warm or otherwise decrease heat transfer. In some embodiments, the container 10 may therefore be uninsulated, so that for example an uninsulated container is provided with audio playback capability.

The figure also depicts at least one speaker assembly 40 disposed in the base 12. In the instant embodiment, the at least one speaker assembly 40 is shown as two speakers 40 in one of the walls 14. A molded-in ring 42 may be provided in the wall 14 surrounding the speaker grill 44. Inside the ring 42, a speaker cavity 19 (FIG. 7) is defined in the wall 14, behind the speaker grill 44, and receives a portion of a speaker assembly 40.

Figure 2:
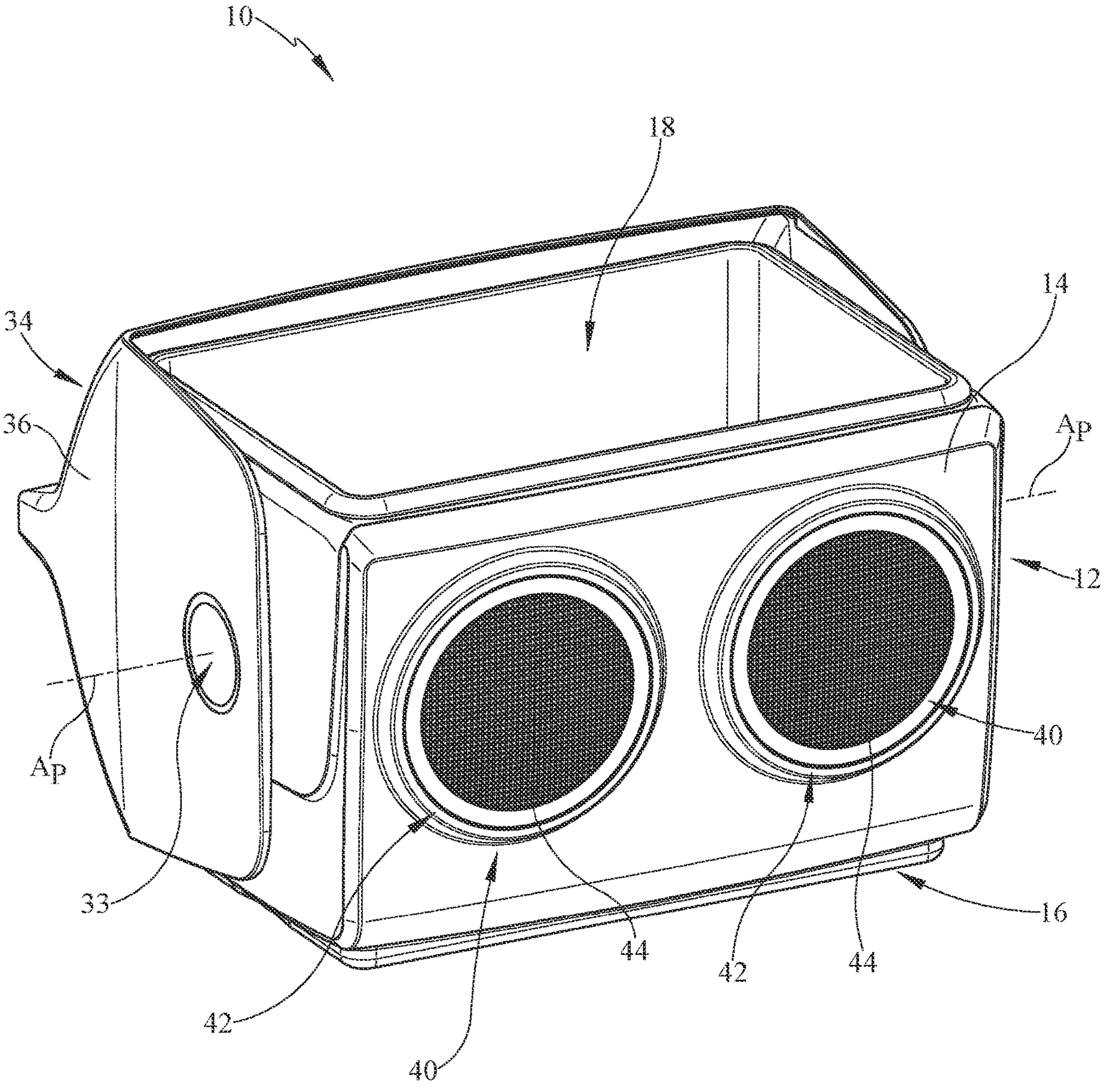
FIG. 2 is a perspective view of the insulated container with a lid in an open position.

As shown in FIG. 2, the lid 30 is pivoted to an open position. The lid 30 movement reveals the cavity 18. The cavity 18 is formed within the at least one wall 14 and the floor 16. In the example four walls 14 are spaced about the floor 16 to define a rectangular shaped cavity 18 for storage. However, other shapes may be utilized.

Figure 3:
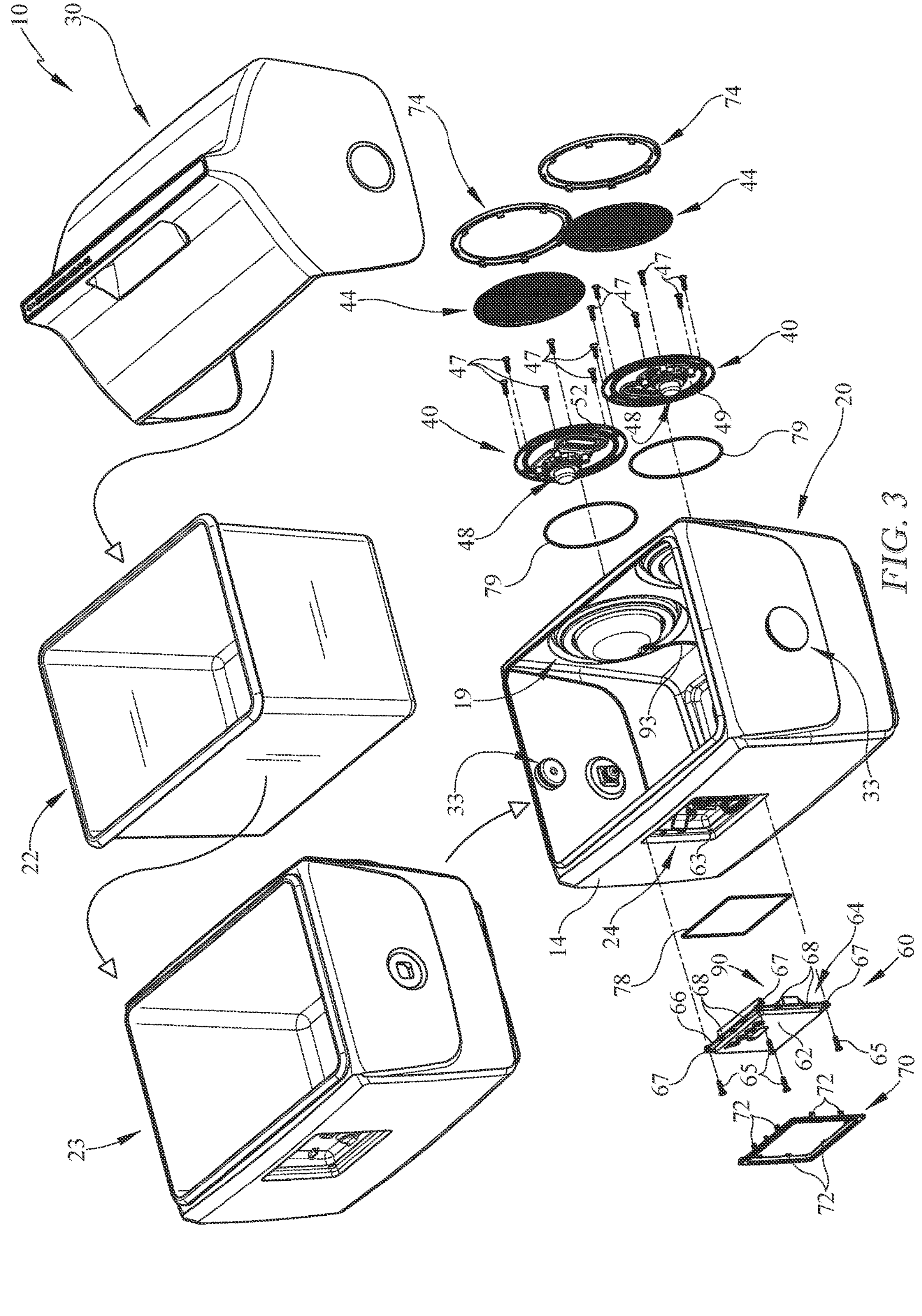
FIG. 3 is an exploded view of the insulated container.

Referring now to FIG. 3, the example cooler 10 is shown in an exploded perspective view. The lid 30 is exploded from the base 12 and revealing the interior of the base 12. The cooler 10 may comprise an outer shell 20, defined by the outer at least one wall 14, an inner shell 22 defined by an inner wall which fits within the outer shell 20, and an insulator, or insulation, 23 disposed between the shell 20 and inner shell 22. The outer shell 20 and the inner shell 22 may be rigid materials or semi-rigid materials which at least are able to stand on their own. In some embodiments, the outer shell 20 may be formed of high density polyethylene (HDPE). In a further example, the inner shell 22 may be formed of a polypropylene in some embodiments. Still further, the insulation 23 which may be disposed between the outer shell 20 and the inner shell 22 may be a polyurethane (PU) foam. In some embodiments, the inner shell 22 and outer shell 20 may be formed separately, and the inner shell 22 installed when the PU foam is disposed in the outer shell 20 and before the PU foam fully expands. These examples are not exhaustive as other material may be used.

Likewise, the lid 30 may also have a lid outer shell, lid inner shell, and an insulation between. However, in the figure, these parts are not exploded. Further however, the lid 30 may also be uninsulated as previously described.

Additionally, the exploded view depicts examples of the at least one speaker assembly 40 and a panel 60. The panel 60 may be formed separately and attached to the base 12. The panel 60 may be removably attached or may be formed so that once the panel 60 is attached, removal will result in some breakage to indicate tampering. Referring first to the panel 60, the cooler 10 has an opening 24 molded in the corresponding wall 14, which is one of the longer walls of the longer pair of walls 14. The opening 24 provides a location and space wherein the removable panel 60 may be located, and wherein an electronic assembly 90 may be located therein. The opening 24 may be formed in the outer shell 20 and may additionally be provided in the insulator 23, as depicted.

With the opening 24 formed in, at least, the outer wall 14 of the cooler 10, the panel 60 may be formed to cover the opening 24. The panel 60 may be formed of various shapes and is shown generally as a square shape in the non-limiting example. However, other shapes may be formed based on the shape of the opening 24 and the size needed for the electronics assembly 90. The panel 60 is shaped generally similarly to the opening 24 so that the interior of the cooler 10, between the outer and inner shells 20, 22 is not exposed. The panel 60 comprises an outer surface 62 and an inner surface 64. The inner surface 64 faces the interior of the opening 24 defining a mounting location for the electronics assembly 90. In such orientation, the electronics assembly 90 may be disposed within the opening 24.

The panel 60 further comprises the electronic assembly 90 disposed on the inner surface 64. The electronic assembly 90 may include at least a circuit board 92, a communication module 94, a rechargeable battery 98 and control circuitry which receives input from controls 80. The combination of the panel 60 and the electronics assembly 90 is modular. The modularity of the panel 60 and the electronics assembly 90 provides an advantage in that the instant device may be utilized not only in the instant container but in a plurality of containers by changing the molded shape of the cooler outer shell 20 to allow for positioning of the panel 60 and electronics assembly 90 therein.

The panel 60 also comprises one or more flanges 66 extending from, and generally surrounding, the panel 60. The depicted flange 66 has a plurality of fastener apertures 67 about the periphery of the panel 60. The apertures 67 allow passage of fasteners 65 through the flange 66 to attach the panel to the cooler 10. The cooler 10 may also comprise a plurality of aligned bosses 63 which align with the fastener apertures 67 of the flange 66 and receive the fastener 65 to retain the panel 60 in position. The flange 66 is offset from the panel outer surface 62. For example in the instant embodiment, the flange 66 is located toward the inner surface 64 of the panel 60 creating a space or allowance between the outer surface 62 and the flange 66.

The flange 66 may also comprise a plurality of snap retainer holes 68. The retaining holes 68 provide a location for retaining a fastener cover 70. The fastener cover 70 is shaped like the flange 66 and covers the flange 66. The fastener cover 70 may be seated in the space of the offset between the outer facing surface of the flange 66 and the outer facing surface 62 of the panel 60. The fastener cover 70 may comprise one or more snap retainers 72 which extend rearwardly and may comprise a hook or latch feature. The snap retainers 72 may be sized to extend through the snap retainer holes 68, respectively, and hook or latch on the rear of the flange 66. In some embodiments, it may be desirable that the panel 60 not be removed and the snap retainers may be formed to break if the fastener cover 70 is removed, to provide tamper indication.

The outer surface 62 of the panel 60 may include one or more controls 80 and a wired connection 87 as will be described further herein. The controls 80 may be in electronic communication with the electronics assembly 90. The wired connection 87 may allow for charging of the battery 98 and/or wired communication for audio playback.

Between the panel 60 and the wall 14, may be an o-ring 78 or other seal. The o-ring 78 or other seal may provide a seal between the panel 60 and the opening or pocket 24 providing a weather-proof or weather resistant construction.

Also shown on an opposite side of the cooler 10 and exploded from the outer shell 20 is the at least one speaker 40. In the instant embodiment, and without limitation, the at least one speaker 40, also referred to as a speaker assembly, is shown as two speaker assemblies 40. The use of two speakers allows for stereo playback in addition providing improved audio performance. However, a single speaker or more than two speakers may also be used. Each speaker assembly 40 comprises at least one speaker cone 48 and a speaker plate 49. The speaker plate 49 may comprise a plurality of holes 45 which are disposed in the speaker plate 49. The speaker plate 49 is placed over a speaker cavity 19 which is molded into the outer shell 20 of the cooler 10. The speaker cavity 19 is a generally closed structure with a lower profile. The speaker assembly 40 can fit within the cavity 19 and may be sealed by an o-ring 79 to provide a weatherproof or weather resistant assembly. The speaker cavity 19 receives portions of the speaker assembly 40 that extend from the rear of the speaker plate 49 and may define an enclosure for the speaker cone 48. The speaker plate 49 is mounted to the outer shell 20 by a plurality of fasteners 47. Spaced from the speaker plate 49 are speaker grills 44 which cover and protect each speaker cone 48 and a resonator 52 (FIG. 6) located on the speaker plate 49. A fastener cover 74 is additionally spaced from the speaker grill 44 and is fastened to the speaker plate 49 by a similar latching structure as described with the panel 60.

Figure 4:
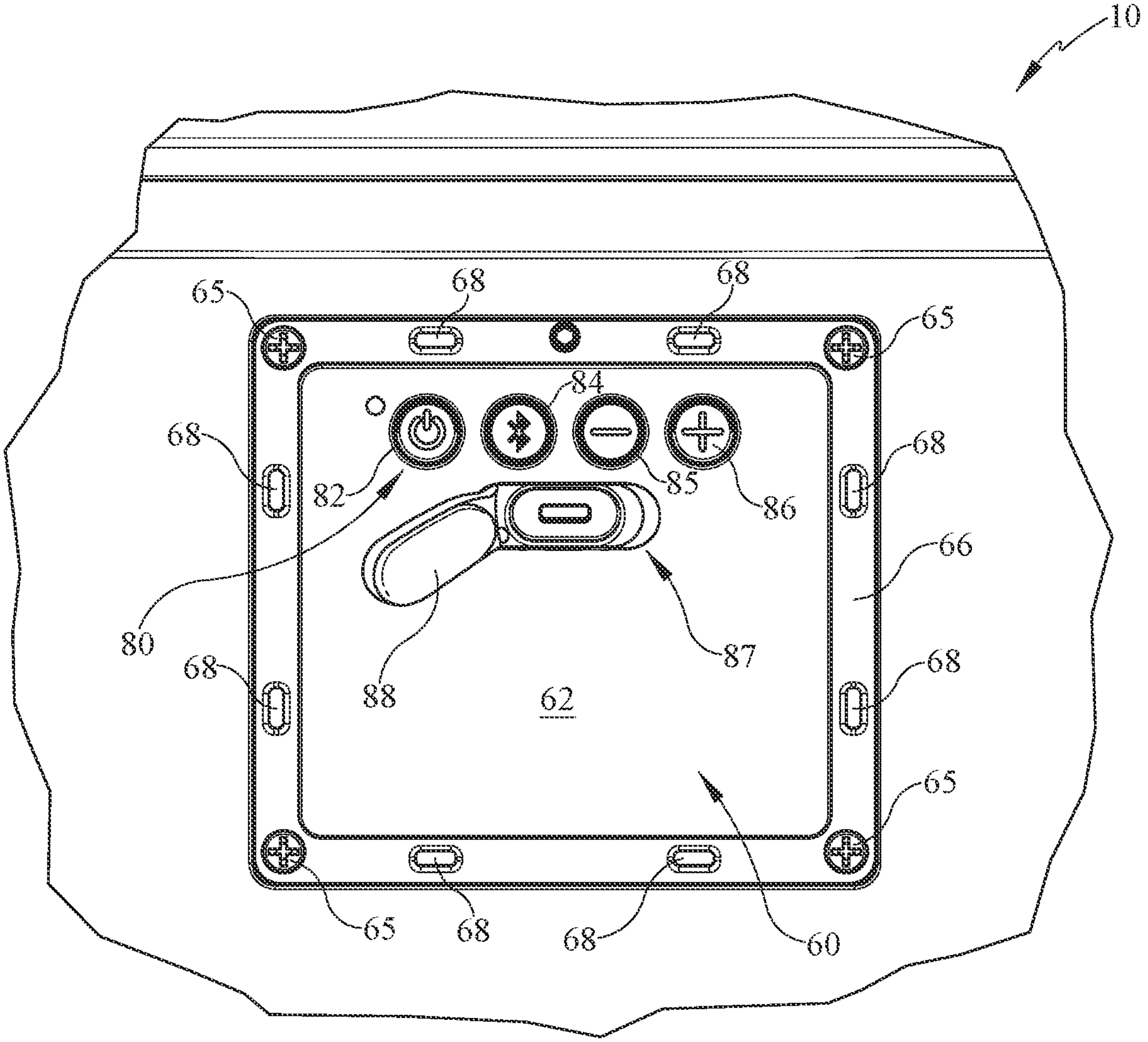
FIG. 4 is a rear perspective view of the insulated container depicting the panel.

Referring now to FIG. 4, a rear view of the cooler 10 is provided with the panel 60 in position but the fastener cover 70 not yet installed. In this view, the panel 60 is positioned in the opening 24 (FIG. 3) of the cooler 10 and is retained in place by the plurality of fasteners 65. The panel 60 is shown in this view as generally square or rectangular in shape. Additionally, other shapes may be utilized depending on the shape of the opening 24 in the cooler outer shell 20. The panel 60 comprises the flange 66 extending thereabout which receives the fasteners 65 to retain the panel in position and may or may not be removable, as noted.

The flange 66 also comprises the plurality of retaining apertures 67 (FIG. 3) spaced about the panel 60. The fastener cover 70 further comprises the retainers 72 that extend through the aperture 67 to retain cover 70 in position and hide the fasteners 65 when installed. In order to remove the panel 60 and electronic assembly 90 one need only remove the cover 70 and then remove the fasteners 65.

Also shown in this view are the controls 80 on the panel 60. As previously described, the panel 60 includes an electronics assembly 90 (FIG. 3) on an inward or rear side of the panel 60. The electronics assembly 90 allows for wireless communication and power to the one or more speaker assemblies 40 so that audio may be played through the cooler 10. This may be desirable at a picnic, or at the beach for example. The panel 60 may include a plurality of differing controls 80 and the instant embodiment comprises several which are described in a non-limiting manner.

The controls 80 of the panel 60 may comprise a power button 82 to turn on the amplifier and communication module. To the right of the power button maybe a connection button 84. For example, this button 84 may activate the communication module to connect with a smart device such as a phone or tablet to establish a wireless communication link for audio signal. As previously described, the wireless communication may be any of various standards including but not limited to Bluetooth, Wi-Fi, zigbee, or others.

Additionally, the panel may include volume controls 85, 86 to increase or decrease power to the speakers, for volume adjustment. Still further, the controls 80 may comprise a light emitting diode (LED) for example to indicate the system is powered on, or off. In some embodiments, the LED may blink in patterns to provide a message to a user, for example during troubleshooting.

Below the control buttons is a connector 87 and movable cover 88 for the connector. The connector 87 allows connection of a wire with the circuit board 92 for powering the rechargeable battery 98 as well as wired communication. Accordingly the wired connector 87 may be used for audio communication instead of wireless communication with the cooler for audio playback. The connector 87 may be of various types and in some embodiments may be USB-C. However, this is not limiting as others may be used.

Figure 5:
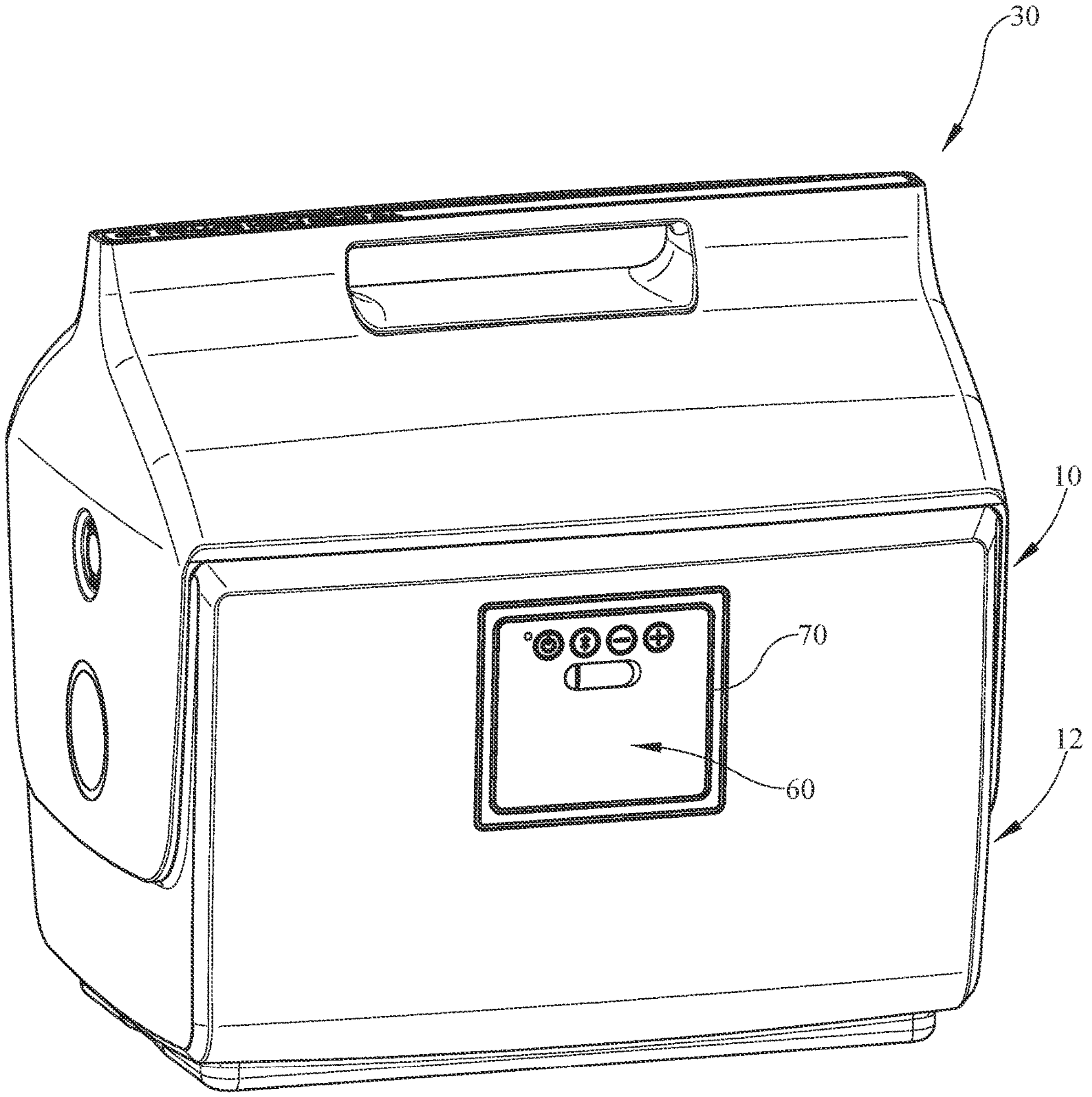
FIG. 5 is a rear view of the insulated container with the fastener cover disposed about the panel.

Referring now to FIG. 5, the rear of the cooler 10 is shown. In this view, the fastener cover 70 is over the flange 66 and around the panel 60. Accordingly, the fasteners 65 are not seen in the panel 60 location providing an aesthetically pleasing appearance and some tamper resistance.

Figure 6:
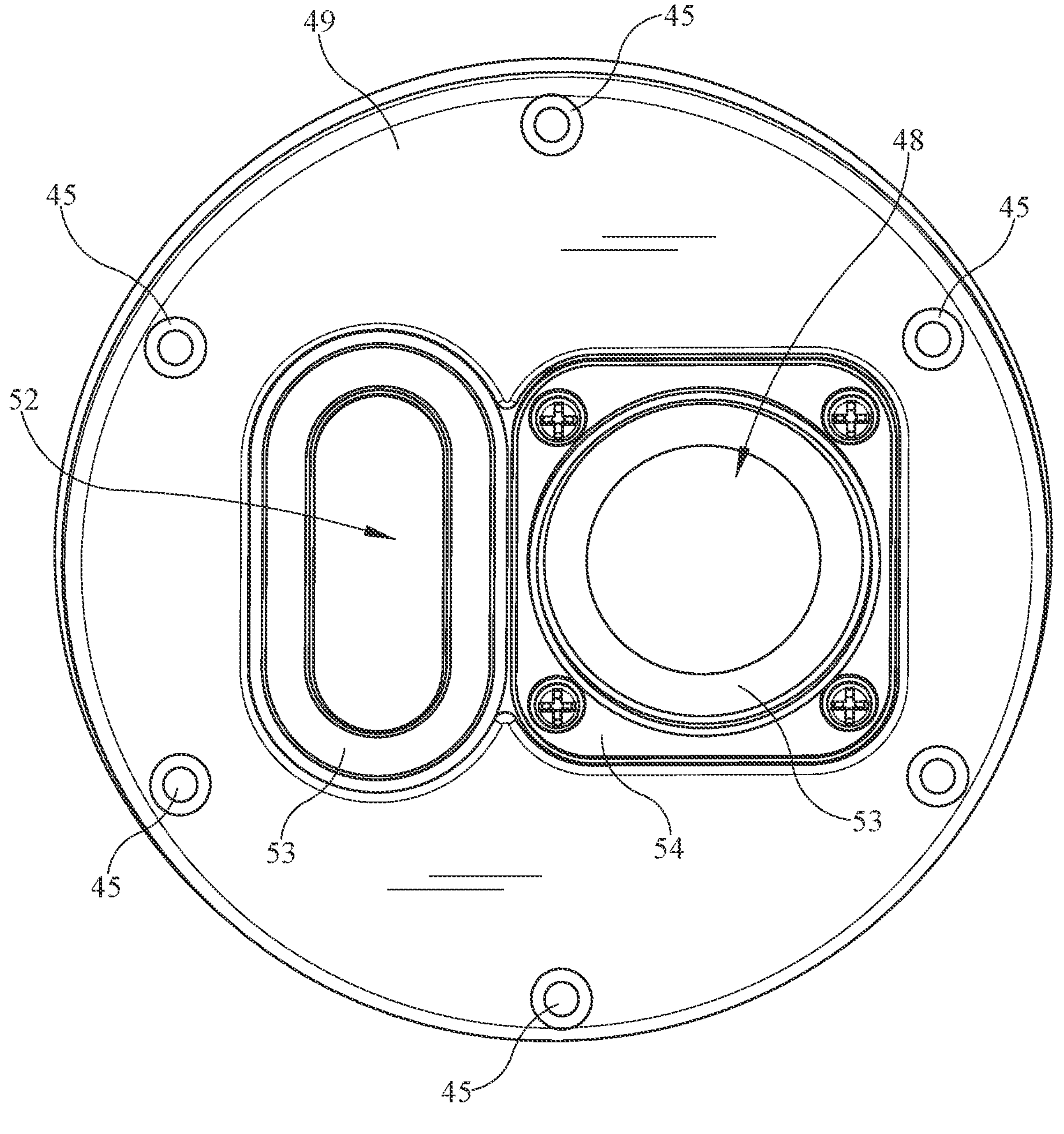
FIG. 6 is a plan view of a speaker assembly.

Referring now to FIG. 6, front view of the speaker assembly 40 is shown removed from the cooler 10. The speaker assembly 40 comprises a speaker plate 49, a speaker cone 48, a resonator 52, and a plurality of fastener holes 45 spaced about the speaker plate 49. The resonator 52 may be co-molded or over-molded with or to the plate 49. The resonator 52 may be formed of natural rubber, rubber-based, silicone, or silicone-based materials. For example, according to some non-limiting embodiments, the soft rubber-like passive radiator may be nitrile butadiene rubber (NBR). In some embodiments, the resonator 52 may have a shore A hardness of 55, but this only one example and others may be utilized. The speaker cone 48 is powered by the electronic assembly 90 on the panel 60. A wired connection 93 (FIG. 3) may be maintained between the electronic assembly 90 and the speaker cone 48. The wired connection 93 may be disposed on the interior of the outer shell before the inner shell 22 and the optional insulation 23 are disposed therein.

In the instant embodiment, the speaker cone 48 and the resonator 52 allow tuning of frequency response of the speaker cone 48. The frequency tuning allows the speaker cone 48 to be tuned to increase volume of desired frequency ranges. For example, in some embodiments, the speaker cone 48 may be of a smaller size which aids in reduced weight of the cooler 10 and improved portability. However, the frequency range may be reduced for lower frequency in these smaller sized speakers. Accordingly, the resonator 52 may be used to increase frequency response for lower ranges (bass frequencies) in order to improve lower frequency bass response, for example.

The speaker cone 48 may be formed of paper or other materials. As the cooler is may be used both inside and outside, it may be desirable to form the speaker cone and resonator 52 of more durable material, for example polypropylene or polyethylene. This list is not exhaustive, and it is contemplated that other materials may be utilized.

The speaker cone 48, resonator 52 and plate 49 may be formed in various ways. The speaker cone 48 and resonator 52 may have a surround which is bonded to the plate 49. In some embodiments, the speaker cone 48 and/or the resonator 52 may be formed with a surround which is bonded to a surround plate 54 which is connected to the speaker plate 49. The surrounds 53 may be formed of the same or similar material to the plate 49, so that the surrounds 53 may be bonded to such plates 49, 54.

Additionally, in some embodiments, it may be that the speaker assembly 40 is formed to be removable from the base 12. The speaker grill 44 may be formed on the assembly 40 so that when the assembly is removed, the grill stays in place on the speaker assembly 40. In such embodiment, the powering of speaker, and the wireless communication module, as well as the battery, may be formed on the speaker assembly so that when removed, the speaker assembly 40 continues to function. This may allow for use of the speaker when a small footprint is more desirable, such as during golf for example, or another event where a cooler is not needed.

Figure 7:
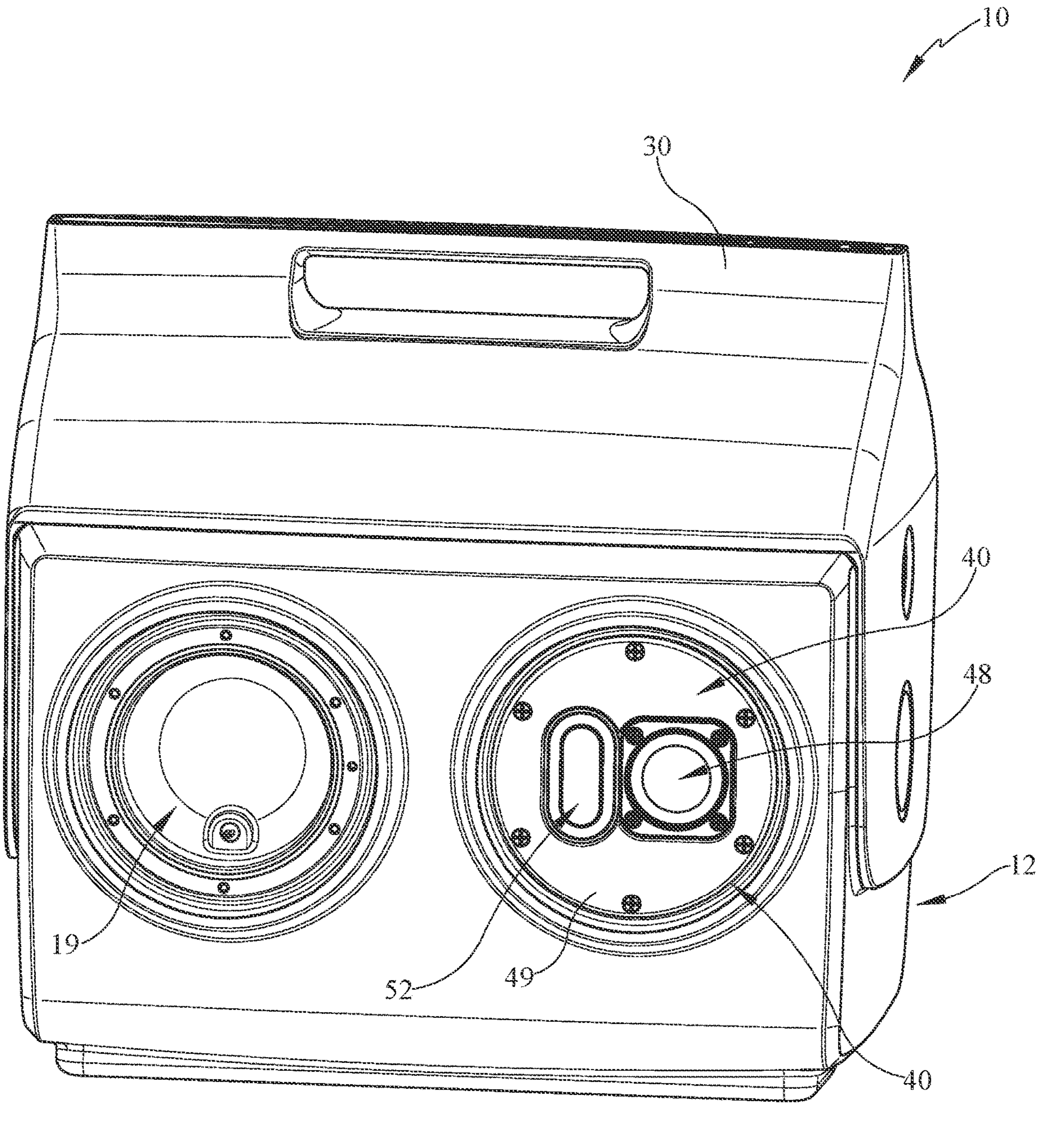
FIG. 7 is a front perspective view of the insulated container with one speaker assembly removed and one speaker assembly exposed by a removed grill.

Referring now to FIG. 7, a front view of the cooler 10 is shown with the speaker assemblies 40 depicted in two manners. On the left-hand side, the speaker assembly 40 is removed to reveal the cavity 18 formed in the outer shell 20.

The cavity 18 has a depth to receive each speaker cone 48 and allow for connection of wiring to the speaker assembly 40. The cavity 18 is molded integrally into the outer shell 20. The depth of the cavity and size may depend on the shape of the speaker plate 49 and the depth of the speaker cone 48. On the right-hand side, speaker assembly 40 is shown with the speaker grill 44 and fastener cover 74 removed.

Each speaker assembly 40 is positioned in the outer shell 20, in a cavity 18. The speaker plate 49 covers the cavity 18 and the electronics assembly 90 is located therein. The speaker plate 49 may or may not seal the cavity 18. The air leakage may function as a port for tuning of speaker performance, but the arrangement may or may not be sealed.

Figure 8:
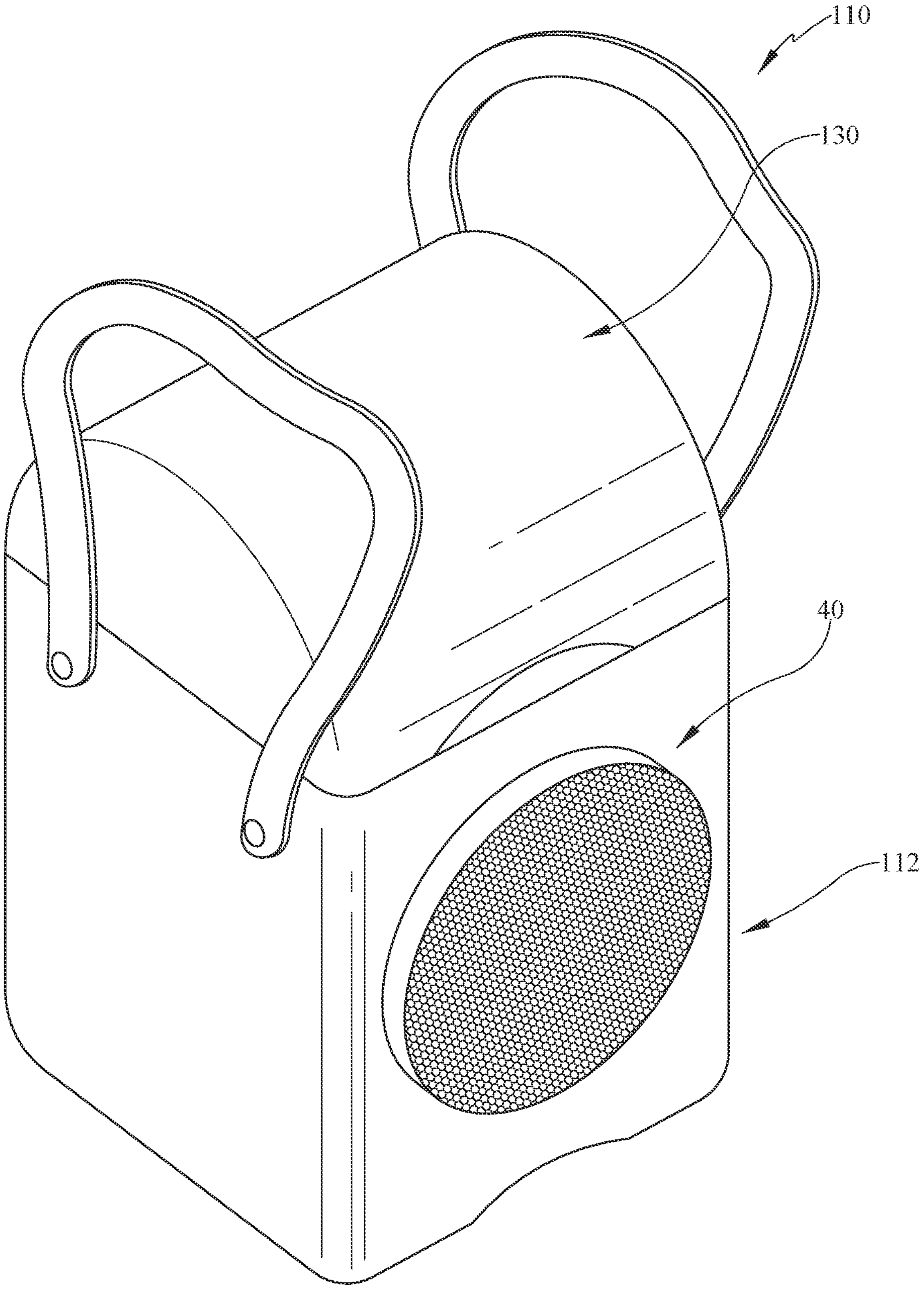
FIG. 8 is an alternate embodiment of an insulted container with at least one speaker; and, FIG. 9 is a schematic view of a printed circuit board defining an electronics assembly.

Referring now to FIG. 8, an alternative cooler 110 is shown in perspective view. The cooler 110 is shown having an alternate shape and size. The lid 130 is pivotally connected to the base 112. The cooler 110 comprises a speaker assembly 40 and the panel 60 may be disposed on an alternate surface. A wired connection may be disposed between the electronics assembly 90 and the speaker assembly 40. Accordingly, an advantage of the present embodiments is exposed. Coolers 110 may be manufactured with variations in the outer shell 20 to accommodate the speaker assembly 40 and the panel 60. By additionally providing a wire in the cooler between an inner shell and an outer shell, the addition of an audio arrangement may be provided to existing coolers (to be manufactured), and future designs.

Figure 9:
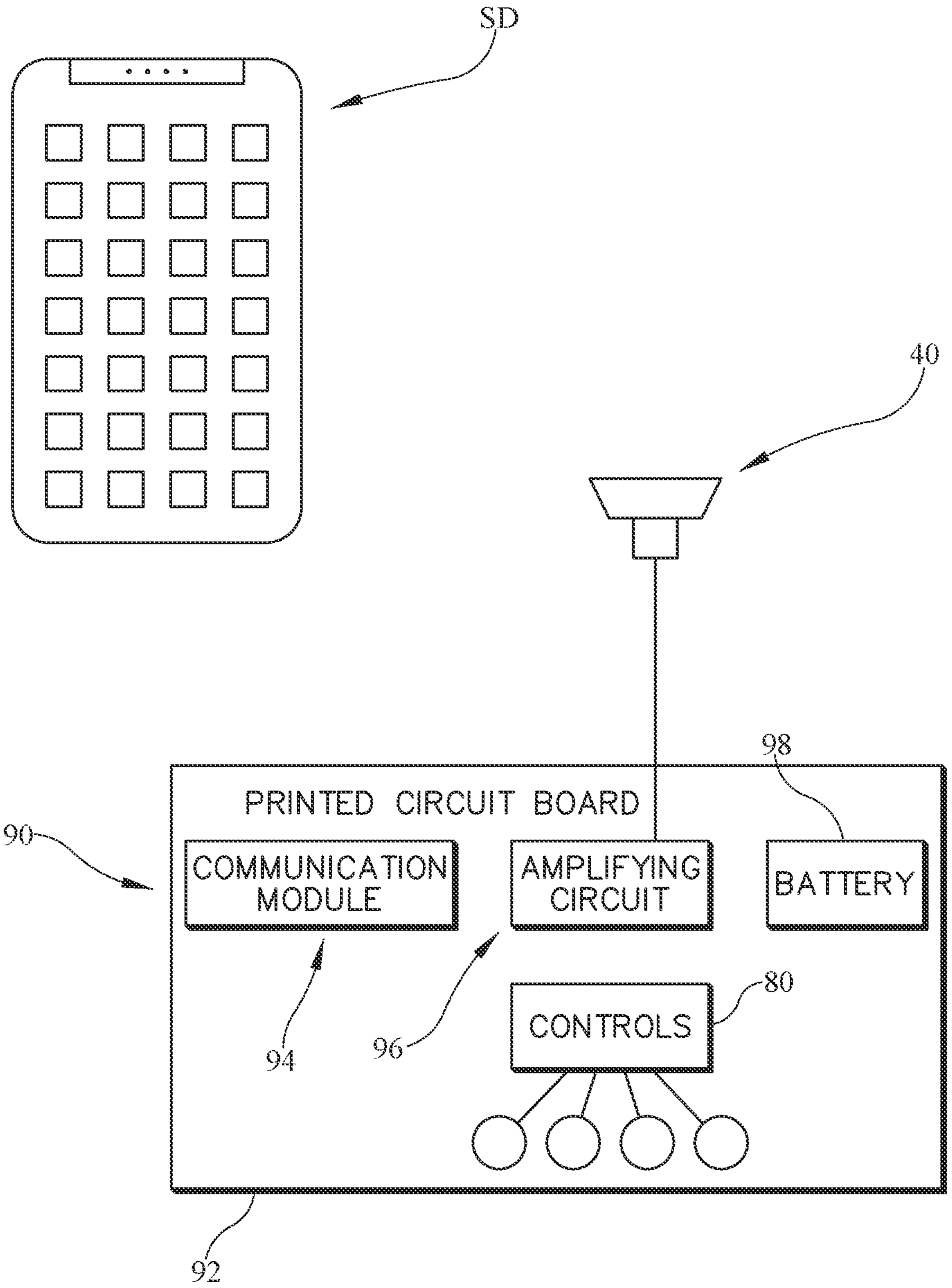

Referring now to FIG. 9, a schematic drawing of the electronics assembly 90 and speaker connection to the electronics assembly 90. The electronics assembly 90 comprises a printed circuit board (PCB) 92 and may also be referred to as a main board. The electronics assembly 90 also comprises a communication module 94 which allows for wired and/or wireless communication with a smart device SD, depicted in the example as a smart phone for non-limiting example.

The smart device SD may for example have an app for music playback and wirelessly communicate such music to the communication module 94. The smart device SD may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. The smart device SD may be connected by wire or wirelessly, such as by radio-frequency, to the communication module 94. In addition or alternatively, short-range communication may occur, such as using a Bluetooth, WiFi, or other such transceiver of the communication module 94. Various wireless communication standards may be utilized, as will be understood by one skilled in the art.

The circuit board may optional comprise memory to store information and store instructions for execution. In some implementations, the memory may be a volatile memory unit or units. In some implementations, the memory may be a non-volatile memory unit or units. The memory 704 may also be another form of computer-readable medium, such as a magnetic, optical disk, or solid state.

The electronics assembly 90 may also comprise an amplifying circuit 96. In order to power the at least one speaker assembly 40, the amplifying circuit 96 provides power to in turn allow for music playback through the one or more speaker assemblies 40. The amplifying circuit 96 receives audio signal from the communication module 94, and may or may not provide additional signal processing before sending the signal to the speaker 40 for playback.

Additionally, at least one battery 98 is provided on the electronics assembly 90. The battery 98 may be mounted to the circuit board 92 or may be connected by a wired connection but not attached to the printed circuit board 92. The at least one battery 98 may be of various forms and in some embodiments may be a lithium battery or battery pack (including two or more cells). The battery 98 may also be a rechargeable battery, such as a lithium ion battery or nickel cadmium, or may be some other type of rechargeable battery. Likewise, the battery 98 may be a non-re-chargeable such as an alkaline battery, for non-limiting example.

The controls 80 are also show on the electronics assembly 90. The controls 80 are disposed on the panel 60 and may include the power, connection, and volume controls previously described. Further, the controls 80 may also include the connector which provides electrical communication for charging the at least one battery 98, or may provide for wired communication to the amplifying circuit 96 directly or indirectly for music playback.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to “A and/or B”, when used in conjunction with open-ended language such as “comprising” can refer, in one embodiment, to A only (optionally including elements other than B); in another embodiment, to B only (optionally including elements other than A); in yet another embodiment, to both A and B (optionally including other elements); etc.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e. “one or the other but not both”) when preceded by terms of exclusivity, such as “either,” “one of,” “only one of,” or “exactly one of.” “Consisting essentially of,” when used in the claims, shall have its ordinary meaning as used in the field of patent law.

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified. Thus, as a non-limiting example, “at least one of A and B” (or, equivalently, “at least one of A or B,” or, equivalently “at least one of A and/or B”) can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. An insulated container, comprising:

a base and a lid disposed on top of said base;

said base having:

an outer shell and an inner shell, and an insulator disposed between said outer shell and said inner shell;

each said outer shell and said inner shell having a floor and at least one wall extending from said floor;

a cavity defined within said inner shell for storage within said base;

said lid having:

a first upper surface, a second upper surface, and opposed first and second end walls;

each of said opposed first and second end walls pivotally connected to said base, so that said lid is pivotable from a first closed position to a second open position;

at least one opening molded in said at least one wall or said floor of said outer shell of said base and at least one speaker cavity molded in said outer shell;

a panel having an electronics assembly mounted thereon, said panel including a circuit board, at least one rechargeable battery, at least one communication module in communication with said circuit board, said panel having a flange and a plurality of fastening apertures on the flange, said panel located at said opening;

a fastener cover disposed around said panel and over said flange;

a wired connection extending between at least one speaker assembly and said panel between said inner shell, said outer shell, and through said insulator.

2. The insulated container of claim 1, further comprising a handle on one of said base or said lid.

3. The insulated container of claim 1, said panel comprising a plurality of controls.

4. The insulated container of claim 1 wherein said panel is a removable panel.

5. The insulated container of claim 1, further wherein said at least one speaker assembly is located on an opposite side of said base from said panel.

6. The insulated container of claim 5, further comprising a second speaker cavity for positioning of a second speaker.

7. The insulated container of claim 5, said at least one speaker assembly comprising a mounting plate, a speaker cone, and a resonator.

8. The insulated container of claim 1, further comprising a communications module having a wireless communication circuit, for wireless communication with a smart device.

9. The insulated container of claim 1 further comprising a first pivot and a second pivot connecting said base and said lid.

10. The insulated container of claim 1, said outer shell being a high density polyethylene.

11. The insulated container of claim 10, said inner shell being a polypropylene.

12. The insulated container of claim 11, said insulator being a polyurethane.

13. The insulated container of claim 7 wherein said at least one communication module comprises a Bluetooth standard, or a Wi-Fi standard, or another wireless communication standard.

14. The insulated container of claim 1, said lid being pivotally connected to said base at ends of said lid and said base.

15. An insulated container, comprising:

a base having an inner shell and an outer shell defining an insulated cavity for storage;

a lid pivotally connected to said base and covering said insulated cavity;

a panel having an electronics assembly comprising a rechargeable battery, at least one communications module, and a plurality of controls;

an opening formed in one of a plurality of walls, said opening covered by said panel;

said panel further comprising a flange and a plurality of fastening apertures in the flange, said panel located at said opening;

a fastener cover disposed over said flange;

at least one speaker disposed in another of said plurality of walls;

each of said at least one speaker and said panel being fastened by fasteners to a corresponding portion of said outer shell, said fasteners covered by fastener covers respectively surrounding said panel and surrounding said at least one speaker;

a wire extending within a floor or at least one of said plurality of walls, between said electronics assembly and said at least one speaker.

16. The insulated container of claim 15, further comprising a resonator mounted on a mounting plate with said at least one speaker.

17. The insulated container of claim 15, further comprising a grill disposed over said at least one speaker and resonator.

18. The insulated container of claim 17, said grill occluding visibility of said at least one speaker and said resonator.

19. The insulated container of claim 15, said electronics assembly having wireless connectivity for communication with a smart device.

20. The insulated container of claim 15, said lid being movable relative to said base.

21. An insulated container, comprising:

a base having an inner shell and an outer shell defining an insulated cavity for storage;

a lid pivotally connected to said base and covering said insulated cavity;

a panel having an electronics assembly comprising a rechargeable battery, at least one communications module, and a plurality of controls;

an opening formed in one of a plurality of walls, said opening covered by said panel;

said panel further comprising a flange and a plurality of fastening apertures in the flange, said panel located at said opening;

a fastener cover disposed over said flange;

at least one speaker disposed in another of said plurality of walls, wherein said at least one speaker is located on an opposite side of said base from said panel;

a wire extending within a floor or at least one of said plurality of walls, between said electronics assembly and said at least one speaker.

* * * * *